June 24, 1969 W. E. HAGAN 3,451,079
RELEASABLE FLOAT FOR LOCATING AND RAISING SUNKEN OBJECTS
Filed July 18, 1967 Sheet 1 of 2
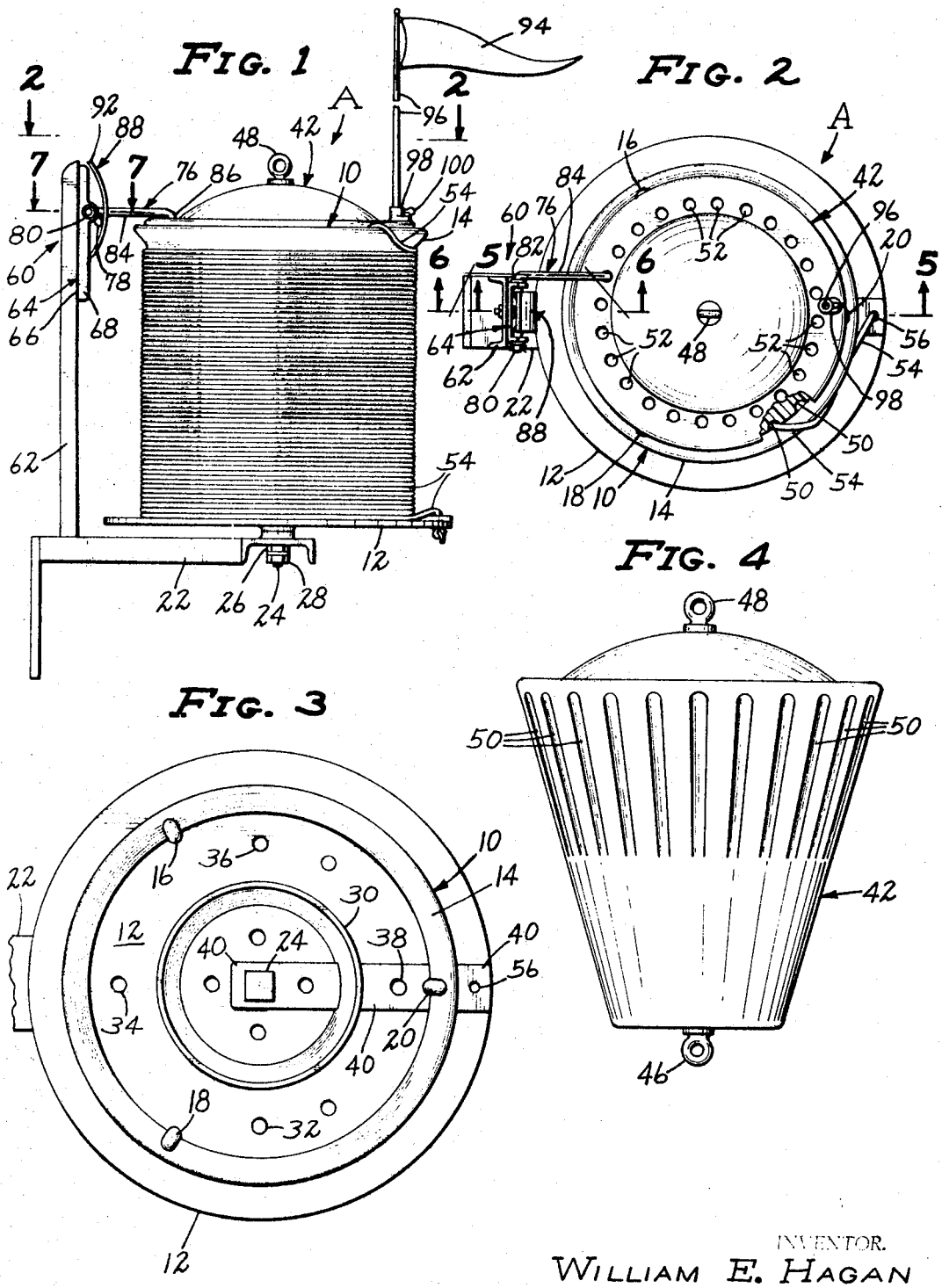
INVENTOR.
WILLIAM E. HAGAN
BY
Caswell, Lazaard & Vicks
ATTORNEYS

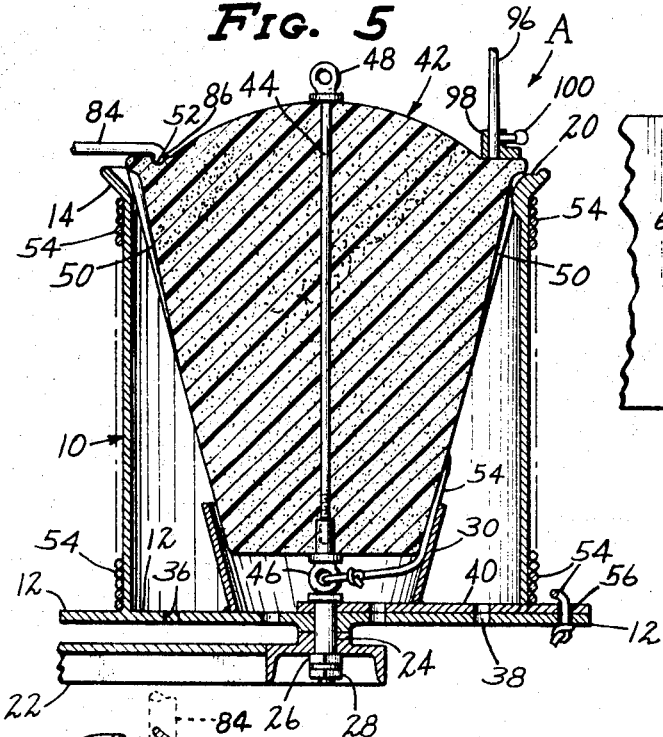
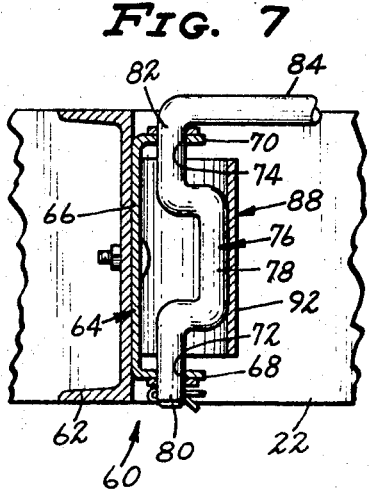
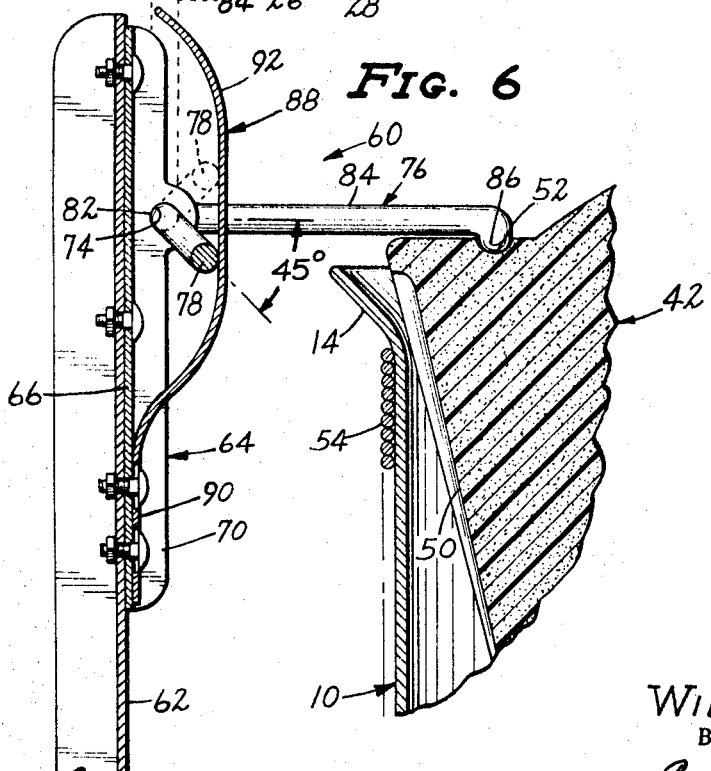

United States Patent Office
3,451,079
Patented June 24, 1969

3,451,079
RELEASABLE FLOAT FOR LOCATING AND RAISING SUNKEN OBJECTS
William E. Hagan, Rte. 1, Box 99,
Two Harbors, Minn. 55616
Filed July 18, 1967, Ser. No. 654,150
Int. Cl. B63b 21/52; B63g 8/34; A01k 93/00
U.S. Cl. 9—9                                           9 Claims

ABSTRACT OF THE DISCLOSURE

The invention includes a drum open at its upper end and rotatably mounted on a base support and on which a line is wound. The line is connected at one end to the support and at the other end to the lower end of a float positioned axially within the drum. The line passes from the drum through recess means formed in the upper wall of the float downwardly to the lower end of the float. The support is connected to an object to be retrieved.

A restraining arm is carried by the support which releasably holds the float within the drum. When the device is submerged, water enters through the recess means of the float and displaces the air in the drum. As a result the float becomes buoyant, and in rising from the drum the float releases the restraining arm to an open locked position. The line is drawn off the rotating drum as the float rises and until the object comes to rest on the bottom.

---

The invention relates broadly to devices for locating and raising sunken objects and more particularly to a device having a float which is attached to an object and which automatically rises from the object when the same sinks in water. The device may be attached to outboard motors, snomobiles, guns and the like. In present day and previously known devices of this character, the release of the line and the float from the object has not been positive and certain.

It is an object of the invention to provide a drum rotatably mounted on a support together with a line wound on the drum. It is a further object to provide a float releasably mounted in the drum with the line secured at one end to the lower end of the float and at the other end to the support. It is also an object to provide recess means in the float through which the line extends between the float and the drum. It is a further object to provide a restraining arm carried by the support for holding the float within the drum, the arm having means for allowing the float to escape from the restraining influence of the arm. The rotating drum allows positive unwinding and feed-out of the line as the float rises to the surface.

It will not be here attempted to set forth and indicate all of the various objects and advantages incident to the invention, but other objects and advantages will be referred to in or else will become apparent from that which follows:

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a side elevational view of the device embodying the invention.

FIGURE 2 is a top plan view on the line 2—2 of FIGURE 1.

FIGURE 3 is a top plan view of the drum of the device with the float and restraining arm removed.

FIGURE 4 is a side elevational view of the float removed from the device.

FIGURE 5 is a sectional view on the line 5—5 of FIGURE 2 with the restraining arm and support therefor removed.

FIGURE 6 is a sectional view on the line 6—6 of FIGURE 2.

FIGURE 7 is a sectional view on the line 7—7 of FIGURE 1.

Referring to the drawings in detail, the device A includes the drum 10 secured at its lower end to the circular support plate 12 which forms the lower end of the drum. The upper end of the drum 10 is formed with the outwardly flared annular portion 14 on which are formed the radially inwardly extending spaced lugs 16, 18 and 20. The lugs 16, 18 and 20 extend radially inwardly of the inner wall surface of the drum 10. The drum 10 is rotatably mounted on the support base 22 by means of the pin 24 secured by the nuts 26 and 28. Further provided is the float retainer 30 which is an inverted frusto-conical formation and which is secured axially of the plate 12 and extending inwardly of the drum. The plate 12 is formed with the water passage holes 32, 34, 36 and 38, the hole 38 also extending through the reinforcement bar 40.

The numeral 42 designates a float which is frusto-conical in formation. The uppermost diameter of the float is slightly in excess of the inside diameter of the drum 10. Extending longitudinally through the float is the rod 44 which has the eye 46 formed on the lower end and the eye 48 formed on the upper end. The dimensional formation of the float is such that the lower end loosely fits within the retainer 30. The float 42 has formed in the outer surface of the upper portion the spaced flute formations 50. The flutes are spaced so that the lugs 16, 18 and 20 will simultaneously engage the flutes when the float is pressed lightly into the drum particularly FIGURE 5. The float 42 has formed in the upper end thereof the plurality of spaced indents 52 which are radially equidistant from the axial center of the float 42.

Further provided is the line 54 which is secured at its lower end to the base 12 by passing the same through the hole 56 formed through the bar 40 and the plate 12 and securing the same thereto, particularly FIGURES 1 and 5. The line is wound upon the drum from the bottom upwardly and it extends upwardly over the upper edge of the drum and downwardly through a flute 50, thence to the lower eye 46 where the upper end is secured thereto, particularly FIGURES 2 and 5.

The numeral 60 designates a restraining mechanism for the float 42 and the same includes the vertical support member 62 which is secured at its lower end to the support base 22. Secured to the upper end of the support 62 is the arm support 64 which includes the base 66 having the spaced walls 68 and 70 extending therefrom at right angles. The walls 68 and 70 are formed with the holes 72 and 74, respectively. Further provided is the crank arm 76 formed with the offset portion 78 from which extend the leg portions 80 and 82. The leg portion 82 terminates in the arm portion 84 formed with the short right-angular extension portion 86 which engages in the indent 52. The angular disposition of the offset portion 78 relative to the arm portion 84 is approximately 45 degrees, FIGURE 6 in particular. The leg portion 80 is journaled in the wall 68 of the arm support, and the leg portion 82 is journaled in the wall 70 to thereby pivotally mount the crank arm 76.

The numeral 88 designates a weak flat spring which includes the base portion 90 secured to the vertical support member, and emanating from the spring base portion is the free ended arcuate spring arm portion 92 which overlies the offset portion 78 of the crank arm 76. The arcuate spring arm portion 92 is spaced from the base 66 and the crank arm offset 78 whereby the arm portion 84 is held in a vertical position towards the base 66 as shown in broken lines in FIGURE 6. The extension 86 of the arm 84 is maintained in downward pressure engagement in the ident 52 of the float when the arm 84 is moved to the horizontal position of FIGURES 1 and 6 with the offset portion 78 pressed downwardly by the spring 88. The arm 84 is held in either a downward position or an upward position. The float 42 is thus held lightly within the drum 10, particularly FIGURE 5, with the lugs 16, 18 and 20 in engagement with the flutes 50 and the lower end of the float loosely positioned axially in the drum by the retainer 30. With the formation of the float being inverted frusto-conical, the float is free to emerge from the drum in a positive free and unobstructed manner.

With the arm 84 in the upward position as in FIGURE 6, the line 54 at the lower end is secured in the hole 56 of plate 12 and reinforcement 40, and the upper end is connected to the eye 46 at the lower end of the float. The drum is now rotated whereby the line is easily wound in successive coils around the drum from the bottom up. If the coils of line extend to the top of the drum with extra line, the coils formed at the top are held in place. The drum is then rotated with the surplus line directed in a coil to the lower end of the drum, whereby further coils of line are formed overlying the first formed coils of line. With a section of line sufficient to extend from the bottom of the drum to the top, the float is positioned in the drum and the line positioned in a flute 50 and outwardly over the upper edge of the drum and onto the same.

The arm 84 is then forced downwardly against the action of the spring into engagement with the top of the float whereby the float is held lightly within the drum and against needless rotation. With the extension hook 86 positioned in an indent 52 the float cannot rotate and thus cause the coils of line to unwind.

The device A is used and operated as follows:

The base 22 is secured to an outboard motor, for example. If the outboard falls into the water, water will pass into the flutes 50 and displace the air in the drum around the float. The float will become buoyant and rise and in rising will displace the arm 84 upwardly into the position of FIGURE 6 shown in broken lines, the offset portion 78 moving from the position shown in full lines to that shown in broken lines. The spring arm portion 92 urges and holds the offset portion 78 in the broken line position of FIGURE 6 with the arm 84 held in a vertical position. With the arm 84 held in a vertical position, the float can rise from the drum, and in rising the line unwinds from the drum. The drum rotation may be given a slight tension by adjusting the nut 26 so that the line does not unwind too fast from the drum. To aid in the location of the float on the surface of the water, the pennant 94 is provided which is mounted on the rod 96 which in turn is secured in the socket 98 by means of the nut 100, the socket 98 being secured to the top of the float 42. With a line 54 of sufficient strength the sunken object can be lifted to the surface for attachment of a heavier adequate line whereby the object can be lifted from the water.

The invention is not to be understood as restricted to the details set forth since these may be modified without departing from the spirit and scope of the invention.

Having thus described the invention, what is claimed as new and desired to be secured by Letters Patent is:

1. A releasable float for locating and raising sunken objects comprising:
   (a) a base for connection with an object,
   (b) a drum rotatably mounted on said base,
   (c) a float,
   (d) means for positioning said float within said drum,
   (e) means for releasably holding said float in said drum,
   (f) a length of line connected to said drum, wound around said drum, extended into said drum and connected to the lower end of said float,
   (g) means for allowing water to enter said drum and cause said float to emerge from said drum and release said releasable holding means and draw line off of said drum.

2. The device of claim 1 in which
   (a) said float is in the form of a truncated cone.

3. The device of claim 2 in which
   (a) said float has flute means formed on the surface thereof in which said line extends.

4. The device of claim 3 in which
   (a) said float positioning means includes lug means formed in said drum for engagement with said flute means.

5. The device of claim 4 in which
   (a) said releasable holding means for said float includes an arm carried by said base and engageable with said float, and
   (b) means for urging said arm into contact with said float and out of contact with said float when said float emerges from said drum due to the displacement of air therein by water.

6. The device of claim 5 in which
   (a) the upper end of said drum is formed with an outwardly flaring annular lip.

7. The device of claim 6 in which
   (a) said float positioning means further includes an annular member within which the float extends.

8. The device of claim 1 in which
   (a) said releasable holding means for said float includes an arm carried by said base and engageable with said float, and
   (b) spring means for urging said arm into contact with said float and out of contact with said float when said float emerges from said drum due to the displacement of air therein by water.

9. The device of claim 1 in which
   (a) said float has flute means formed on the surface thereof in which said line extends.

References Cited

UNITED STATES PATENTS 2,806,231  9/1957  Hofmeister _____ 9—9

FOREIGN PATENTS 1,111,529  7/1961  Germany.
17,994  6/1898  Great Britain.
528,612  8/1921  France.

MILTON BUCKLER, *Primary Examiner.*

JEFFREY L. FORMAN, *Assistant Examiner.*

U.S. Cl. X.R.

43—25; 114—16.5